United States Patent

[11] 3,616,262

[72] Inventors Michael G. Coady
 Broomall;
 Amherst Carleton Haliday Macartney,
 Hatfield, both of Pa.
[21] Appl. No. 645,062
[22] Filed June 9, 1967
[45] Patented Oct. 26, 1971
[73] Assignee Merck & Co., Inc.
 Rahway, N.J.
 Continuation of application Ser. No.
 295,409, July 7, 1963, now abandoned.

[54] APPARATUS AND METHOD FOR PROPAGATING VIRUSES I IN THE EXTRA-EMBRYONIC FLUIDS OF EGGS
 20 Claims, 20 Drawing Figs.
[52] U.S. Cl..................................................... 195/127,
 195/120, 195/1.3, 146/2, 146/221, 134/48,
 134/57, 356/54, 356/58, 356/63
[51] Int. Cl...................................................... C12b 1/00,
 C12b 1/02, C12k 7/00

[50] Field of Search........................................... 134/48, 57

[56] References Cited
 UNITED STATES PATENTS
 2,273,126 2/1942 McGillin ....................... 134/48
 2,524,844 10/1950 Smith ........................... 146/2
 3,147,783 9/1964 Noltes .......................... 146/2

Primary Examiner—Alvin E. Tanenholtz
Attorney—Reverdy Johnson

ABSTRACT: There is disclosed an apparatus and a system for automating the handling of eggs in the various steps of virus production in eggs containing a living embryo. Manual handling of individual eggs is avoided by keeping the eggs in trays, and eight eggs are automatically processed at one time in candling, sterilizing, hole punching, inoculating and sealing the eggs prior to incubation. After incubation the eggs are similarly handled and processed, eight at a time, in candling, chopping off the tops of the eggs, harvesting the extra-embryonic fluids from the eggs, and finally discarding the remainder of eggs.

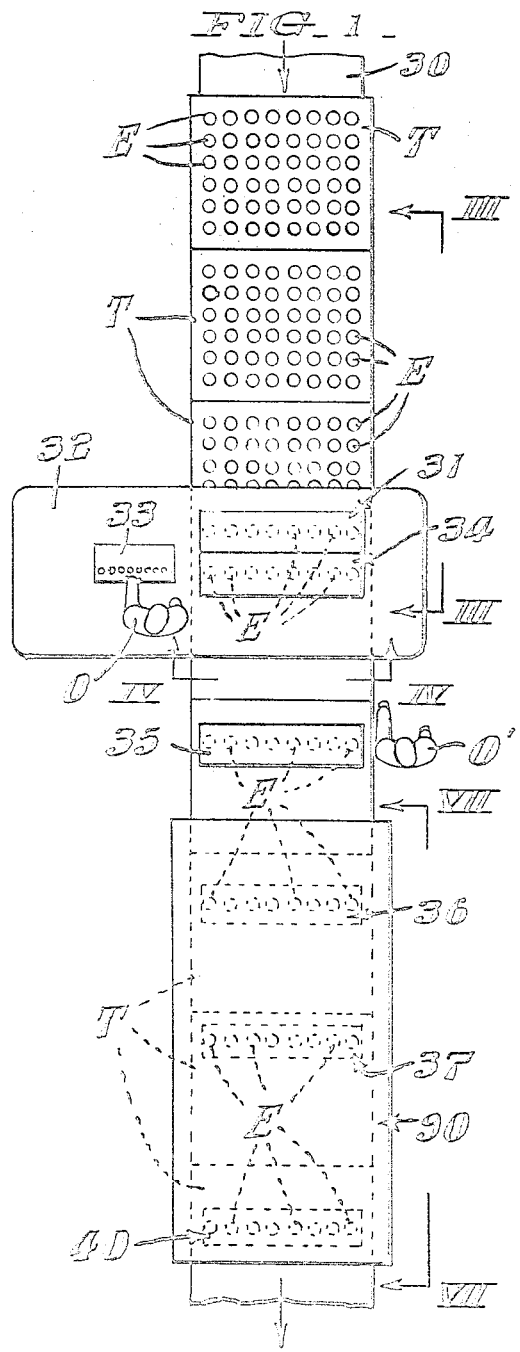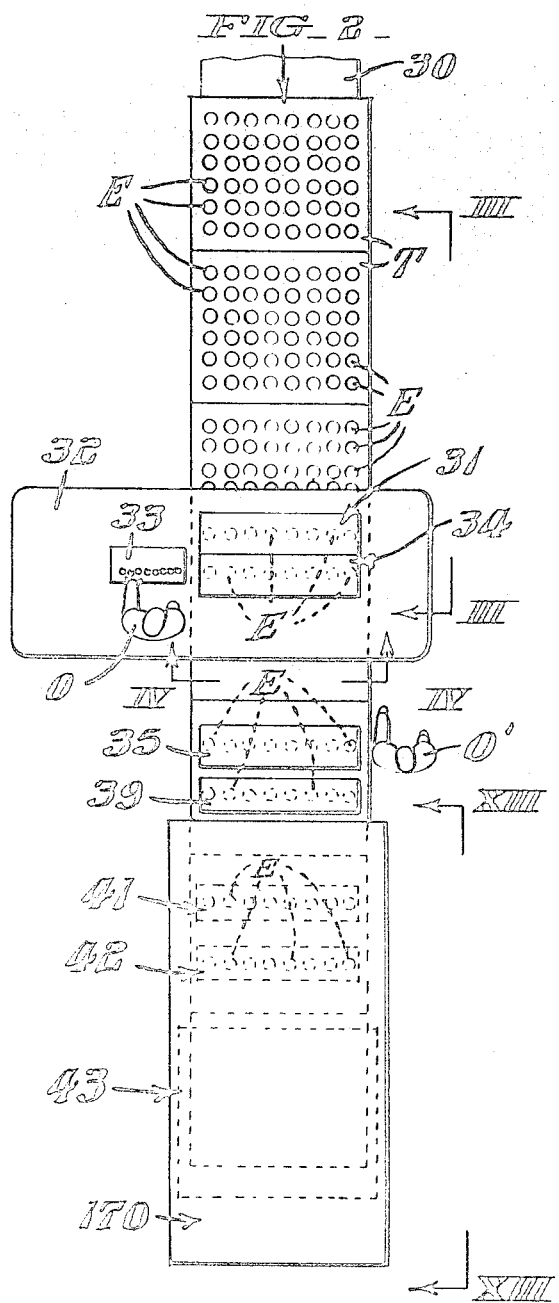

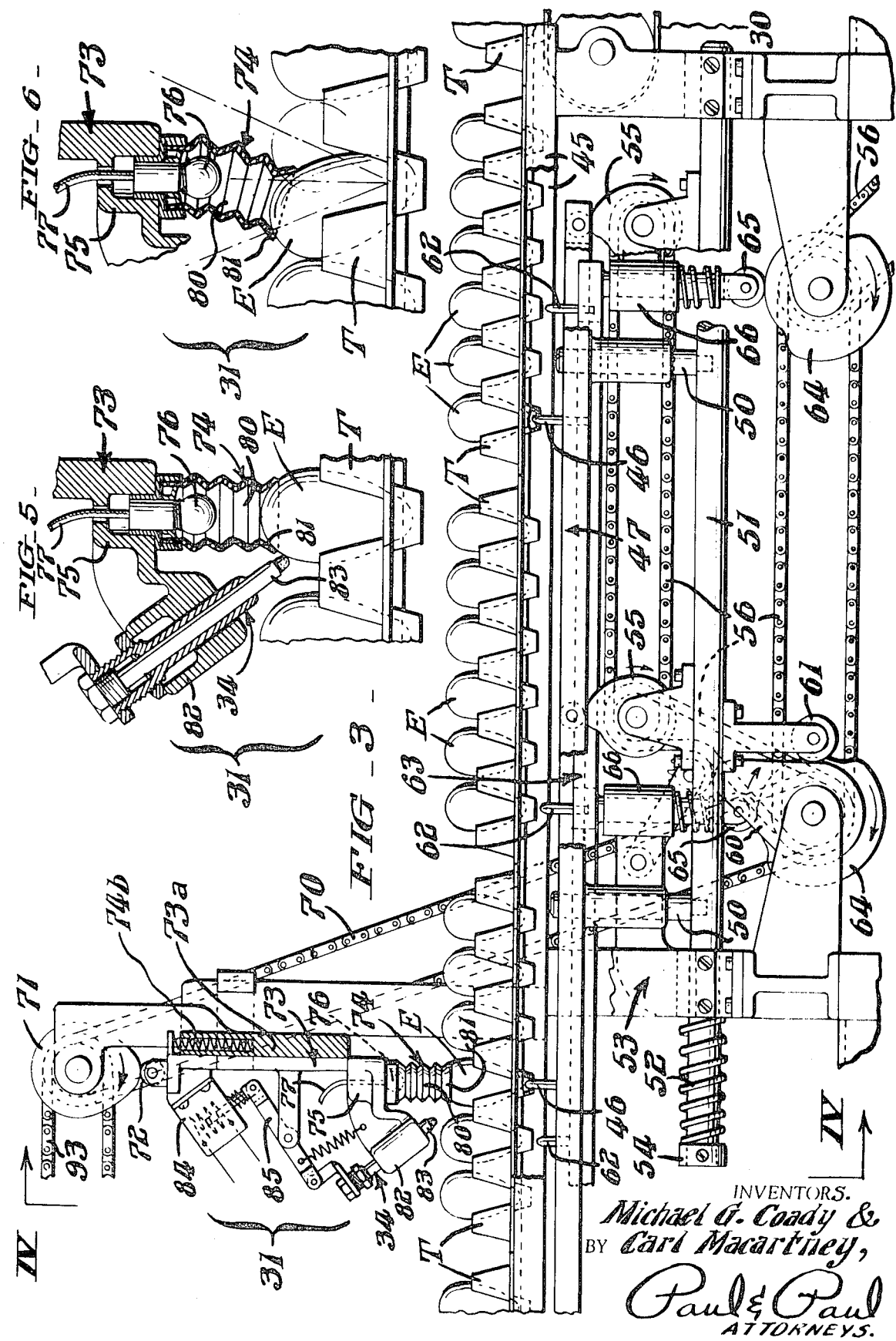

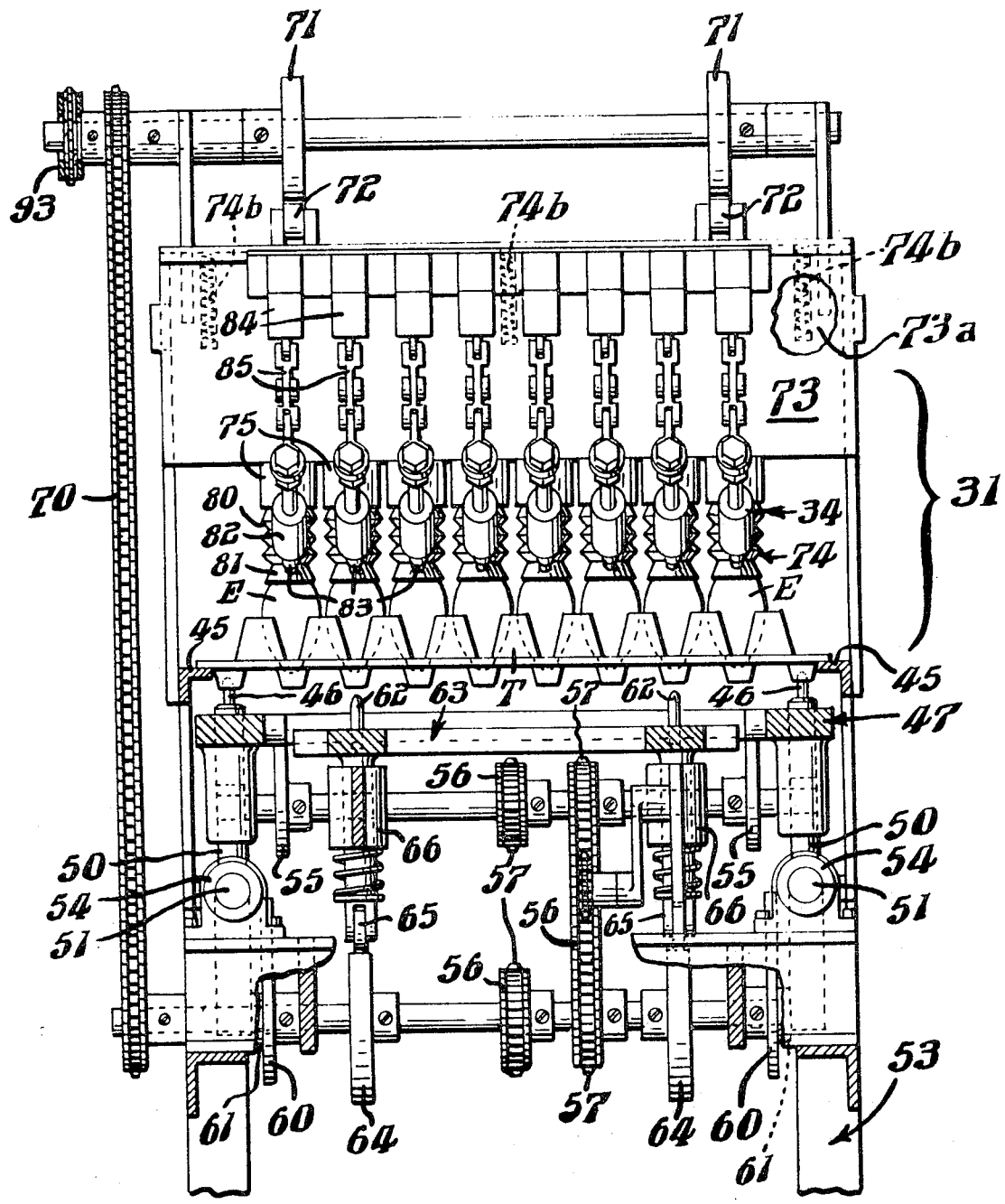

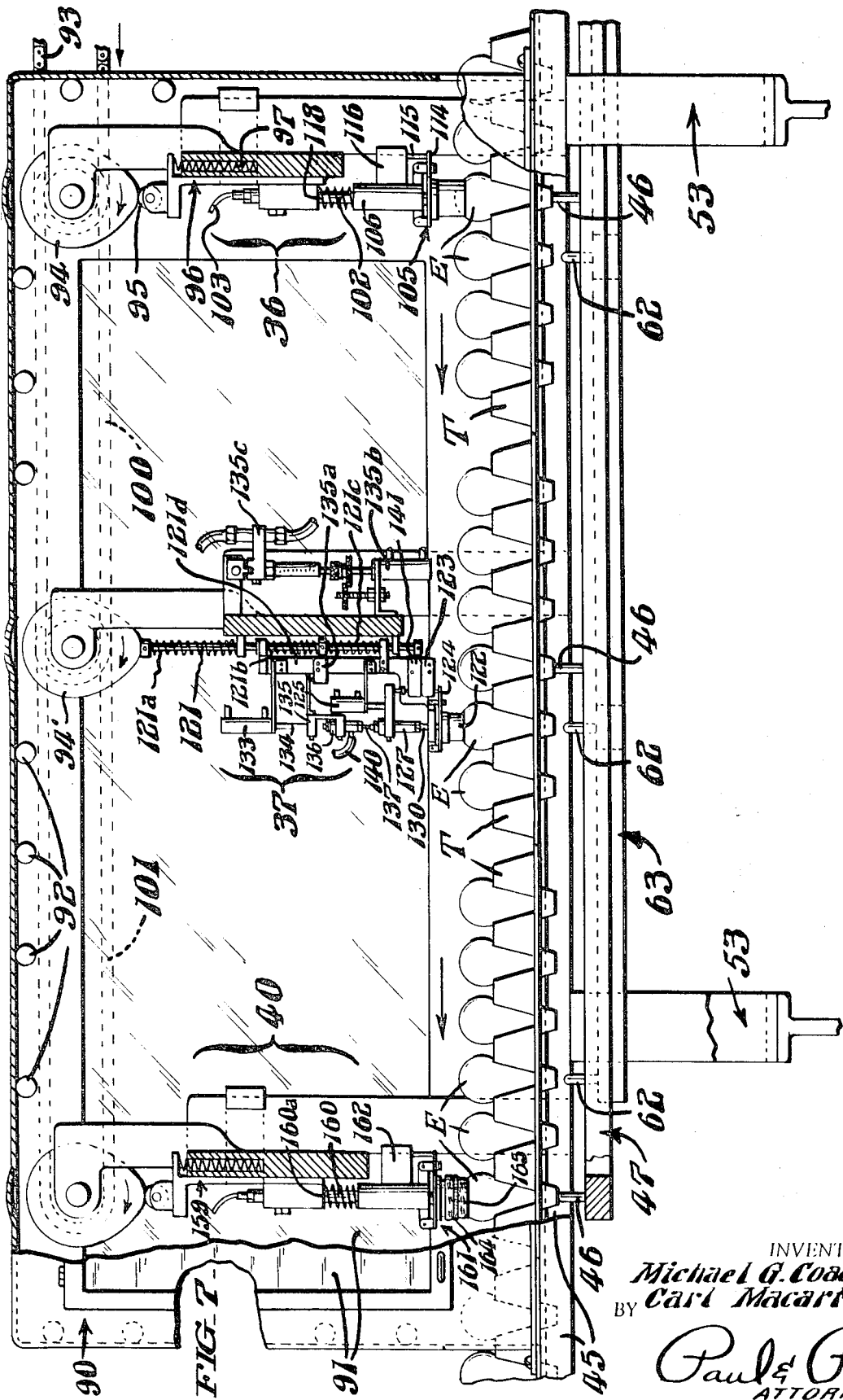

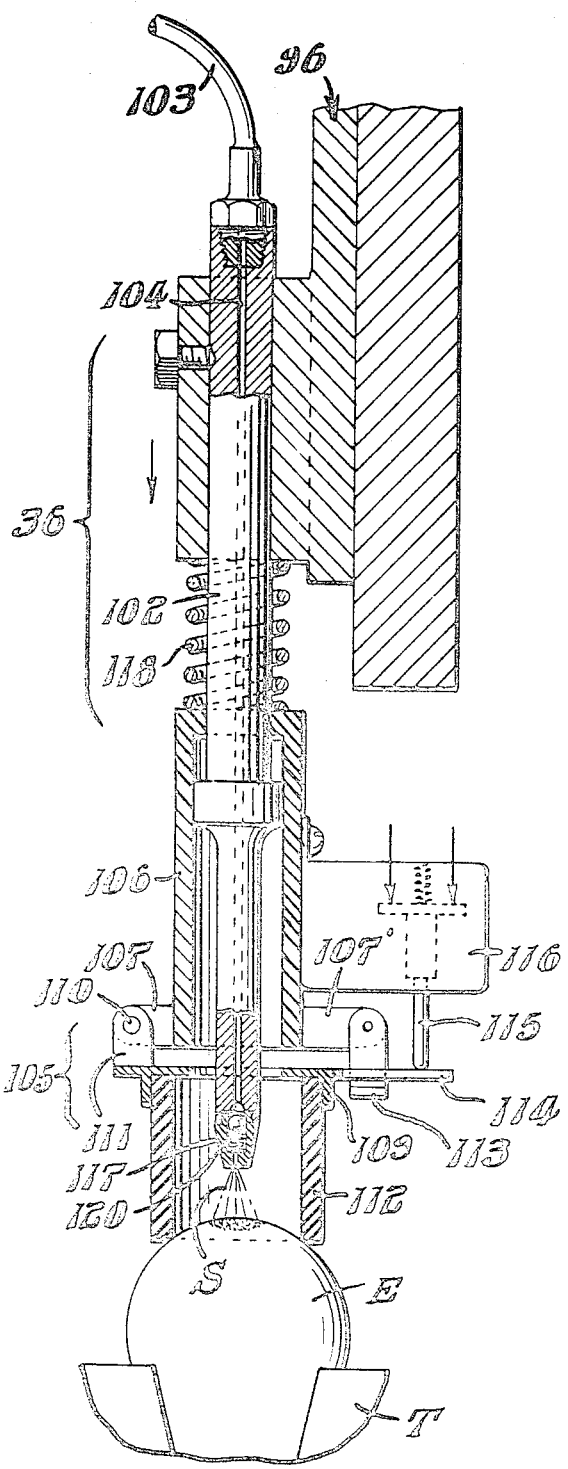
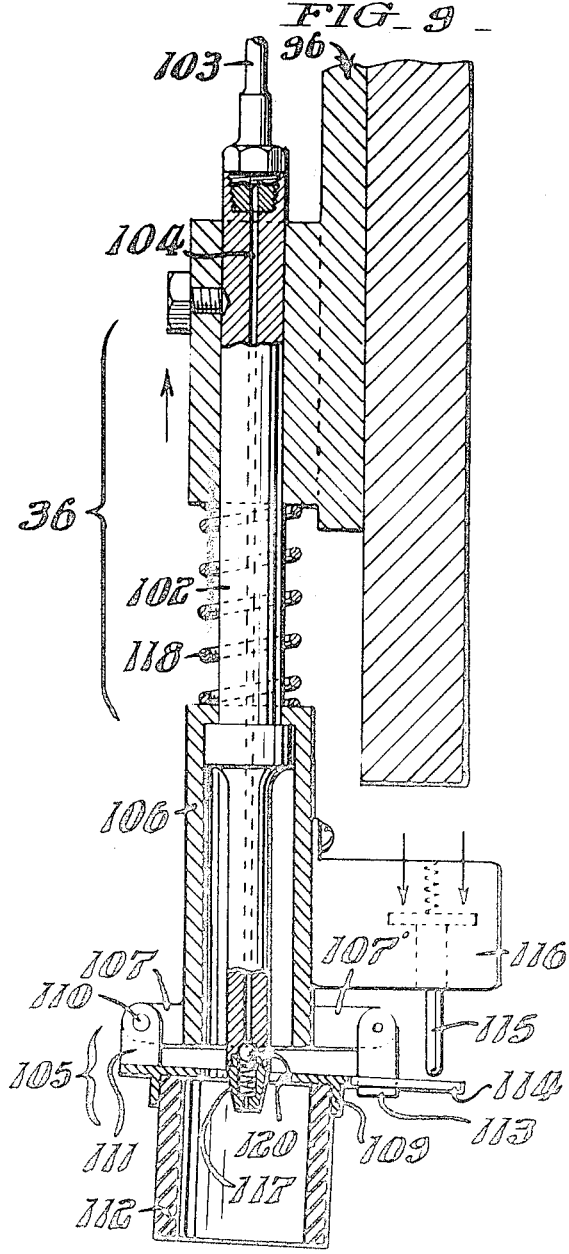

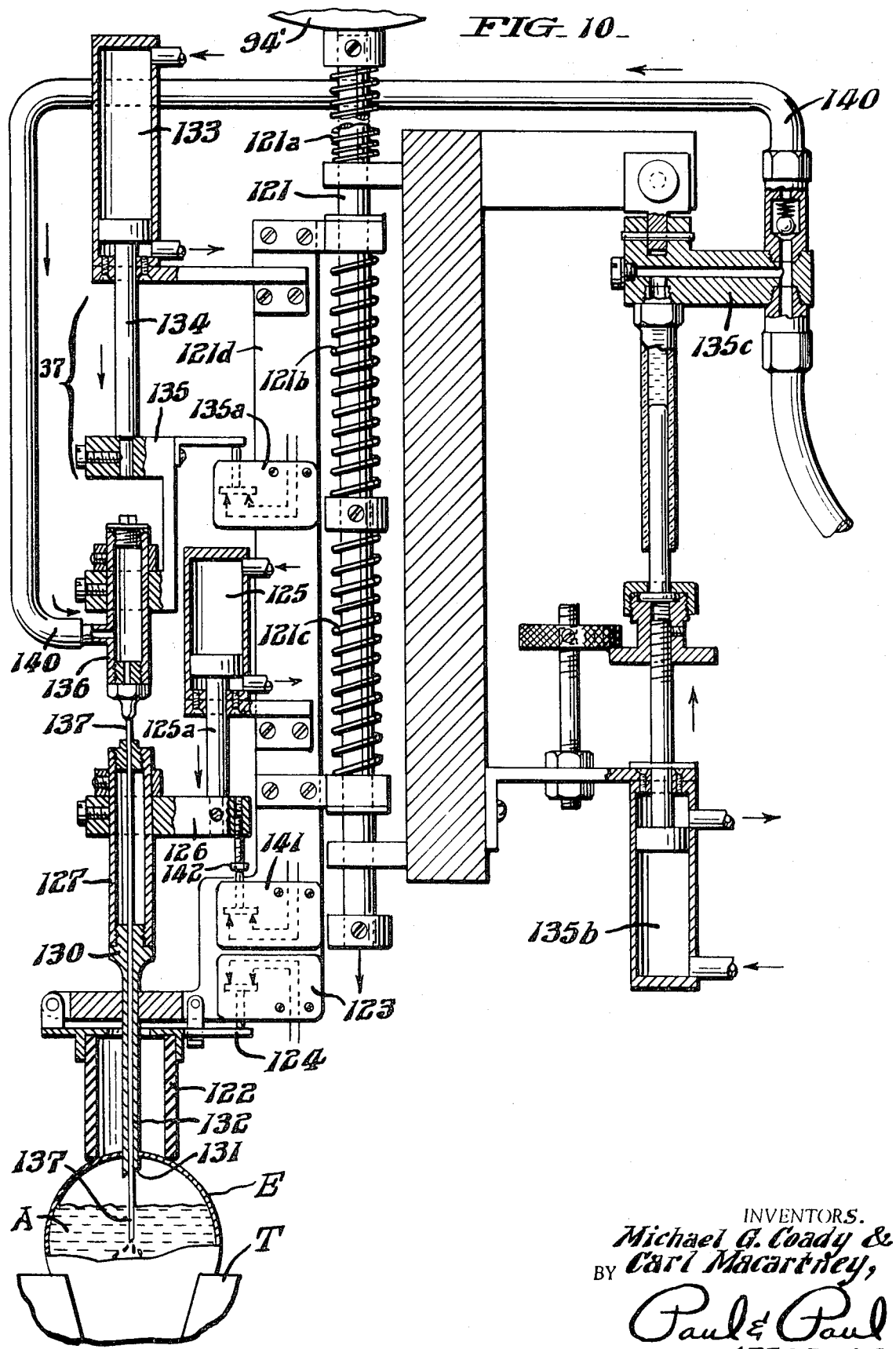

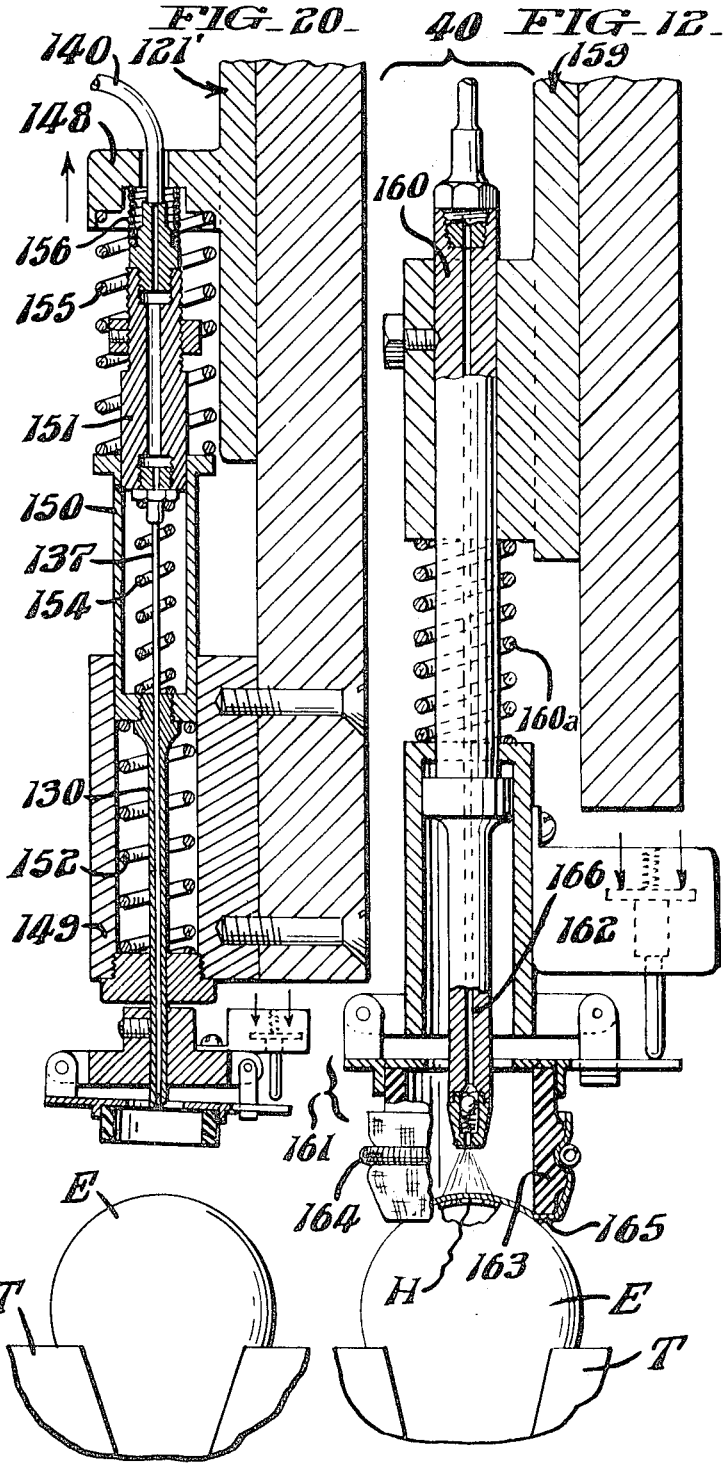

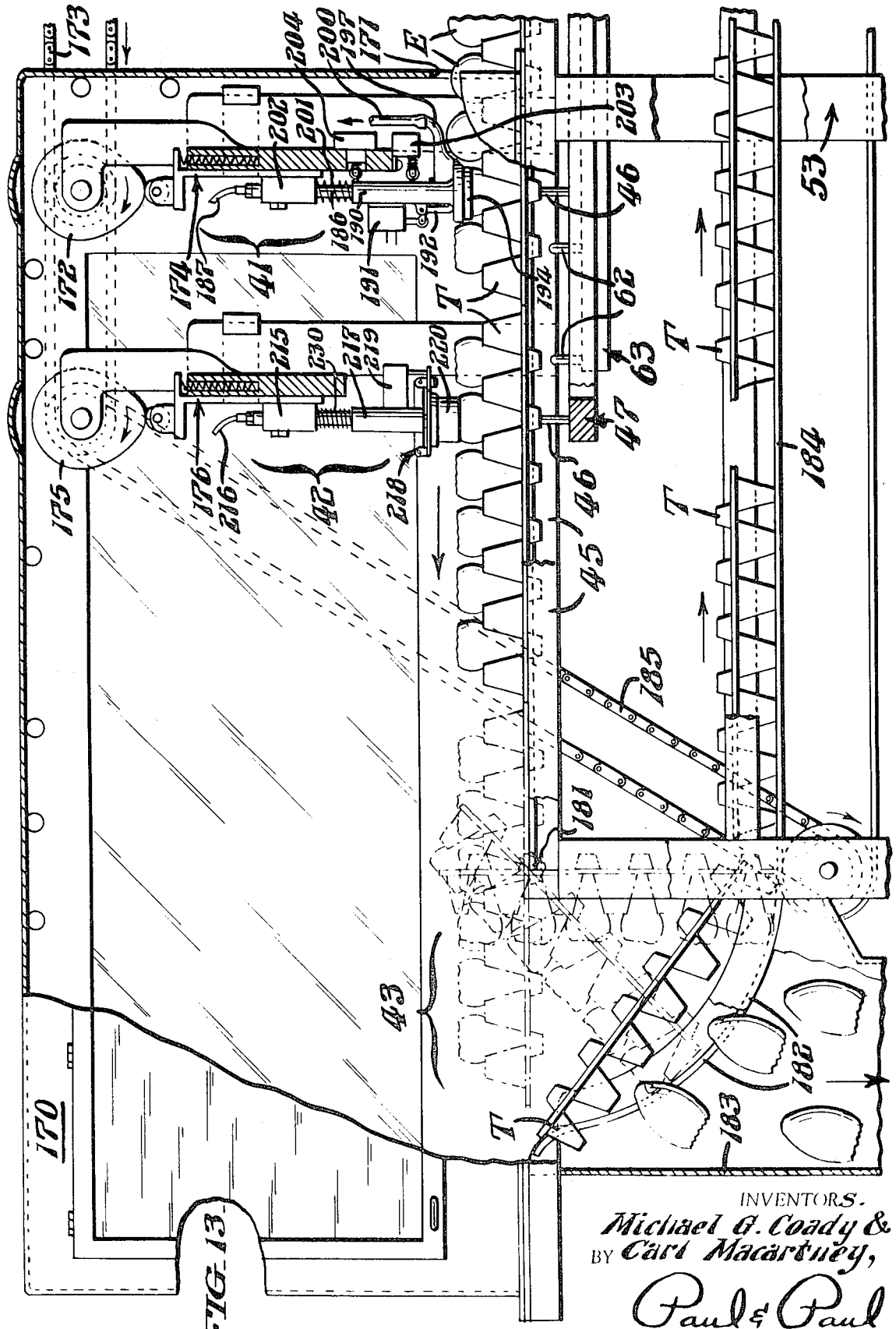

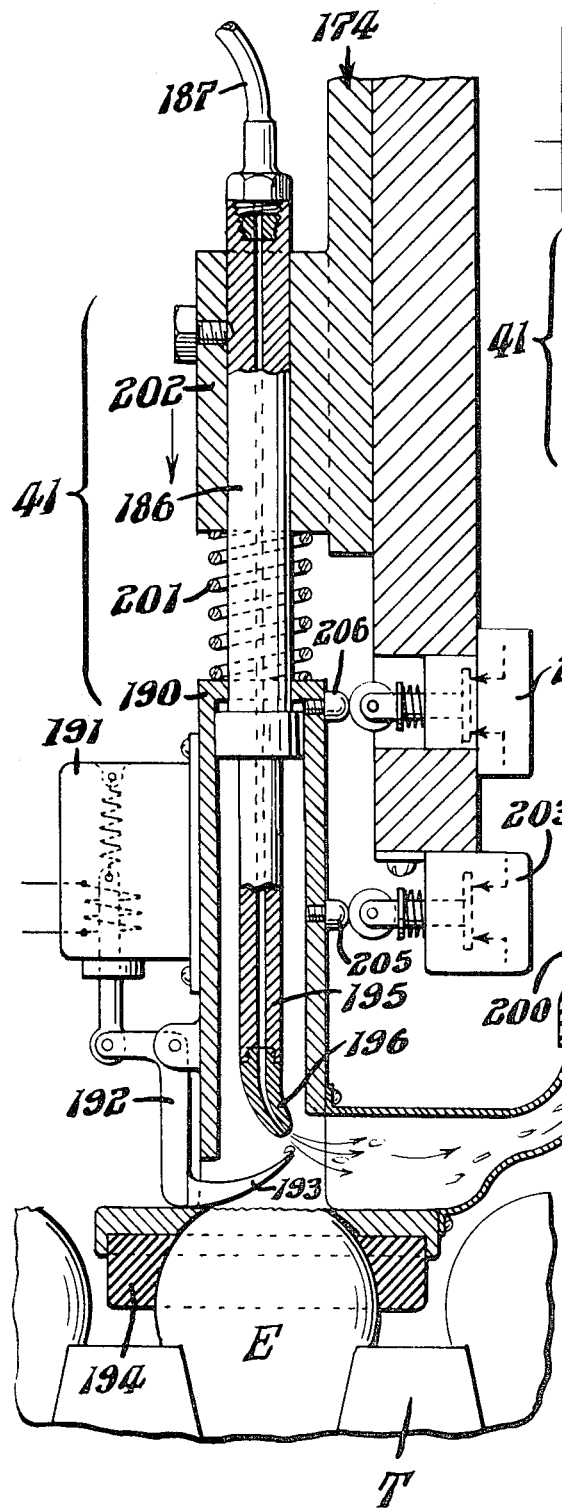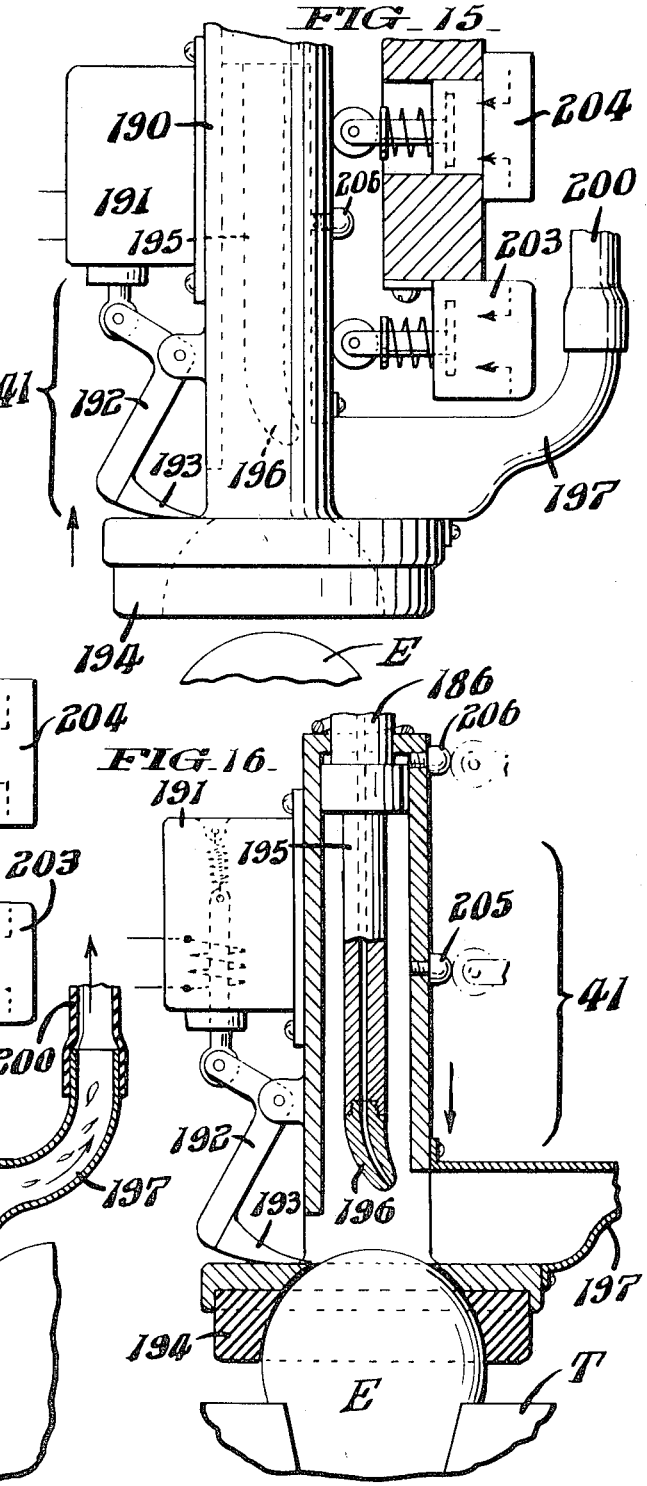

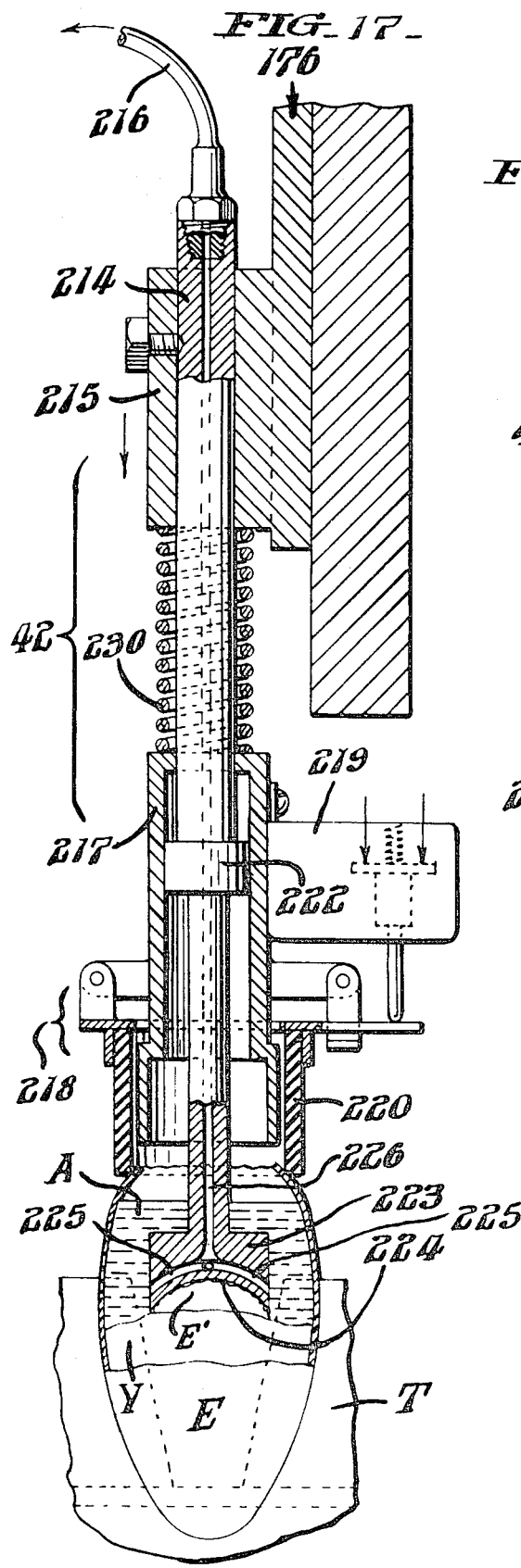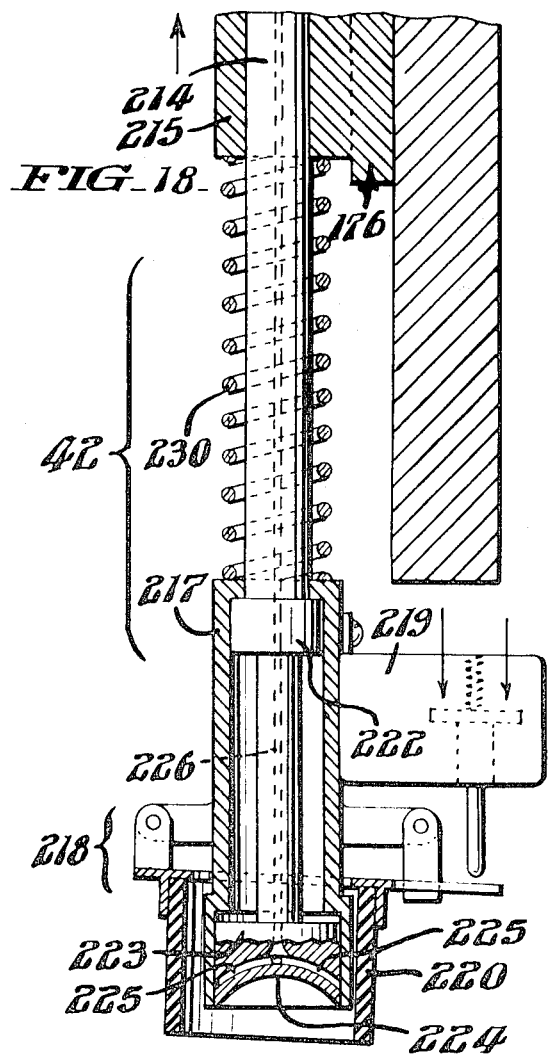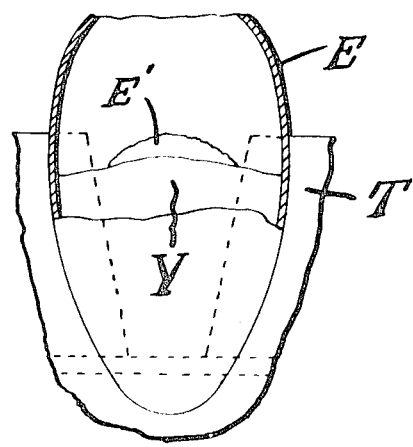

APPARATUS AND METHOD FOR PROPAGATING VIRUSES I IN THE EXTRA-EMBRYONIC FLUIDS OF EGGS

This application is a continuation of application Ser. No. 295,409 filed July 7, 1963 and now abandoned. This invention relates to an apparatus and method for propagating viruses in the extra-embryonic fluids of embryonated eggs. Among the viruses that have heretofore been grown in eggs are yellow fever, smallpox, influenza and Rocky Mountain spotted fever, for example.

Large quantities of vaccines have been produced by propagation of live virus in the extra-embryonic fluids of eggs and harvesting of these fluids after propagation; many thousands of eggs are handled on production lines per day for this purpose. In order to assure optimum propagation, however, the egg must contain a living embryo.

It has been found that, when such eggs are arranged with their pointed ends down and broader ends up, each yolk is located substantially adjacent to the (pointed) bottom of the egg, the embryo is above the yolk and approximately centered, an air sac is at the top, and extra-embryonic fluids extend above the embryo up to the lowermost level of the air sac. Suspended in the extra-embryonic fluids are a multiplicity of veins, connected to the embryo.

It is now the accepted practice to determine whether the embryo is living or dead by visually inspecting the egg. This is often done by manual manipulation of an egg and light source to shine a bright light behind the egg and visually inspecting for the presence of an embryo and red veins in the extra-embryonic fluids.

Heretofore, however, the method of inspection has been tedious and unreliable since no way had been found for mechanically positioning eggs and concentrating a strong beam of light on each egg without either damaging the egg or causing reflections in the eyes of the observer, thus creating numerous errors on the part of the operator. Of course, any intense concentration of light or heat presents the danger of killing the embryo. It should be noted that equipment commercially available for candling infertile eggs for consumption as food will not operate for candling embryonated eggs.

Another problem encountered in conventional methods resides in the fact that the extra-embryonic fluids must remain sterile throughout the operation. Heretofore, in inoculating eggs with a live virus, foreign organisms have been introduced inadvertently with costly results. Any development of harmful bacteria in on egg is transmitted broadly to the product from many, since it is conventional practice to combine into a common pool the extra-embryonic fluids harvested from many eggs.

Accordingly, it is an object of this invention to provide a new and improved apparatus and method for the propagation of viruses and the like in the extra-embryonic fluids of eggs, which is capable of large scale production under sterile conditions, which provides for the growth and harvesting of a maximum quantity of virus-containing extra-embryonic fluids from each egg, and which includes provision for extremely rapid and highly accurate candling of the eggs.

Other objects and advantages of this invention, including simplicity and economy of the same, and the ease with which it may be applied to existing equipment will appear in further detail hereinafter and in the accompanying drawings whereof:

FIG. 1 is a diagrammatic plan view in block form, showing the first phase of a typical operation conducted in accordance with this invention;

FIG. 2 is a view similar to FIG. 1, showing a second phase of the operation;

FIG. 3 is a sectional view taken as indicated by the lines and arrows III—III which appear both in FIGS. 1 and 2, showing a preferred form of egg-candling apparatus in accordance with this invention;

FIG. 4 is a sectional view taken as indicated by the lines and arrows IV—IV which appear in FIGS. 1, 2 and 3;

FIG. 5 is an enlarged sectional view of the egg illuminating and marking portion of the egg-candling apparatus which appears in FIG. 3;

FIG. 6 is a fragmentary view similar to FIG. 5, showing the manner in which the egg-lighting apparatus operates when an egg is inclined at an angle to the vertical;

FIG. 7 is a view in side elevation taken as indicated by the lines and arrows VII—VII which appear in FIG. 1, partly in section, showing a preferred form of apparatus for sterilizing the exteriors of egg shells, inoculating them with fluid containing live virus and sealing them;

FIG. 8 is an enlarged view, taken partly in section, showing that portion of the inoculating apparatus concerned with sterilization of the exteriors of the egg shells;

FIG. 9 is a view similar to FIG. 8, taken in the same manner, but showing the apparatus in its elevated position;

FIG. 10 is an enlarged sectional view showing a preferred form of an inoculating apparatus which appears in FIG. 7;

FIG. 12 is an enlarged view in side elevation taken partially in section, showing a sealing device which is also embodied in the inoculating apparatus appearing in FIG. 7;

FIG. 13 is a view in side elevation taken as indicated by the lines and arrows XIII—XIII which appear in FIG. 2, illustrating a preferred form of chopping, harvesting and disposal apparatus constructed in accordance with this invention;

FIG. 14 is an enlarged view in side elevation, partially in section, showing a preferred form of chopping apparatus contained within the apparatus appearing in FIG. 13;

FIG. 15 is an enlarged view of the central portion of the apparatus shown in FIG. 14, illustrating important features;

FIG. 16 is an enlarged view taken partially in section of the apparatus appearing in FIG. 14, illustrating the operation of the device;

FIG. 17 is an enlarged view in side elevation taken partially in section, showing a preferred form of harvesting apparatus in accordance with this invention;

FIG. 18 is a view similar to FIG. 17 showing the apparatus in its elevated position;

FIG. 19 is a side sectional view showing a modified form of apparatus for sensing, punching and inoculating in accordance with this invention; and FIG. 20 is a similar view taken in the same manner, showing the apparatus in its elevated position.

Figure 11:
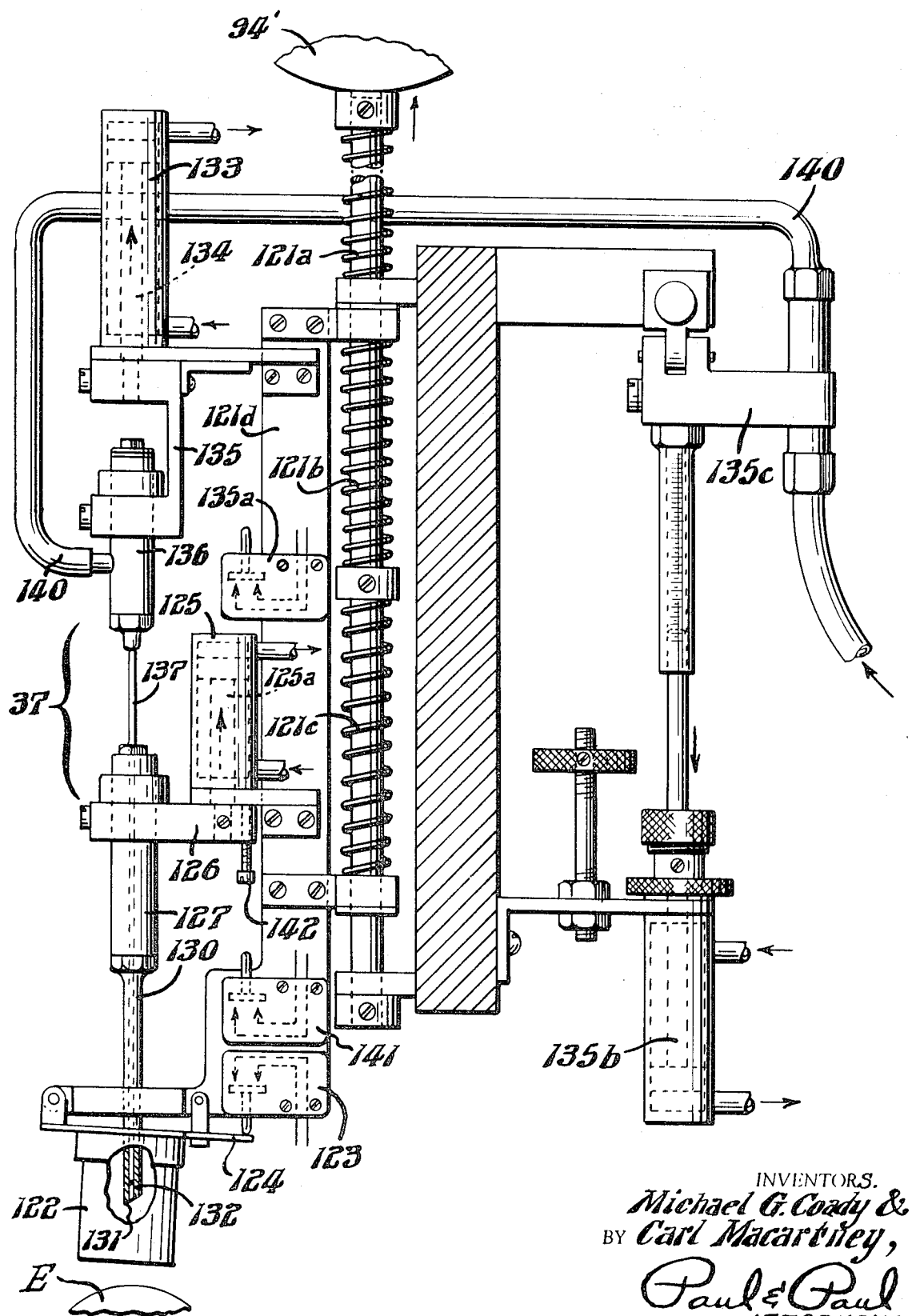
FIG. 11 is a view similar to FIG. 10, showing the apparatus in its elevated position.

Turning now to the specific form of the invention selected for illustration in the drawings, it will be appreciated that the description which follows is intended to refer specifically to those forms of the invention as shown in the drawings, and is not intended to define or to limit the scope of the invention which is defined in the appended claims.

In accordance with this invention, as shown in FIG. 1, it is to be assumed that eggs have been selected which contain live embryos, and have been incubated for a period of approximately 10 to 14 days after laying. Some eggs may be infertile and others will contain nonviable embryos and it is the purpose of this invention of course to separate infertile eggs and those containing nonviable embryos from the eggs containing live embryos. All of the eggs E are contained in trays T, each egg being substantially vertically arranged with its more pointed end at the bottom and with its flatter end at the top. Desirably but not necessarily, these eggs may be arranged in trays rectangularly, eight by six. Eggs may be delivered from a hatchery supplier in trays, thus allowing a process cycle of inoculation and harvesting without removal of eggs from trays. In this fashion, as shown, the trays are successively placed on a feed conveyor 30 where they move to a candling station 31 wherein a light is projected downwardly through the egg and is observed by the operator 0 located in a darkened booth 32. As the machine automatically advances the eggs along the conveyor path, the operator scans the rows of eggs visually and observes any egg which is considered not to possess a live embryo. A marking panel 33 is located in the booth 32 and is electrically connected to a marking device 34 which is manipulated by the operator 0 for applying a visible marking to the outer surface of any egg so designated. As the eggs progress along the conveyor from the marking device 34, they pass through a replacement station 35 where the marked eggs are manually replaced by another operator O'.

The trays, now known to contain eggs all of which have live embryos, advance to a sterilizing station 36 wherein the apparatus automatically checks to determine the presence of eggs on the tray and then proceeds to spray a selected spot in the area of the top of each egg with an antiseptic solution such as tincture of iodine for example. The trays then advance to a punching and inoculation station 37 wherein a minute hole is punched in the area of the top of each egg, through a portion of the shell which was sterilized at the station 36, and the selected virus is inoculated into the extra-embryonic fluids of the egg. The eggs are then automatically sealed at a sealing station 40 and are returned to the incubator (not shown), in order to propagate the virus which was inoculated into the extra-embryonic fluids.

After incubation for any desired period, for example 2 days, the eggs while still on their trays are passed through the apparatus appearing in FIG. 2 of the drawings, which is the second phase of the method. The first portion of the second phase is the same as that referred to in FIG. 1, namely, the candling marking and replacement operations 31, 34 and 35. However, the eggs which are now known to contain living embryos together with propagated virus after a proper period of incubation are chilled as at 39 in any manner well known in the art, such as by dipping the eggs and trays into a cold liquid, and the trays are conveyed to a chopping station 41 wherein the tops of the eggs are chopped off, exposing the extra-embryonic fluids, and then to a harvesting station 42 wherein the extra-embryonic fluids are withdrawn from the eggs. Then, the trays containing the remains of the eggs are conveyed to a dumping station 43 where the eggs are dumped out and the trays recovered, washed and returned to the hatchery.

The specific structures and functions of the processing stations and operations just described will now be taken up individually, in detail.

Turning first structures FIGS. 3 and 4 of the drawings, the candling station 31 is located in the path of the feed conveyor 30 which introduces the eggs E, each contained in its proper position on a tray T. The conveyor 30 is preferably power driven by any conventional drive means, and slides the trays T with their edges resting on top of opposed side rails 45, each tray pushing its predecessor in a downstream direction. The surface of conveyor 30 is preferably somewhat slippery so that whenever the trays T are stopped during the processing operation, those trays which are resting upon the conveyor 30 are permitted to remain stationary while the conveyor slides underneath.

Index pins 46 are provided for engaging selected portions of the trays T outwardly of the eggs thereon, and for indexing the trays stepwise along a predetermined path. A frame 47 which carries pins 46 is mounted on pins 50, which are carried on spaced apart shafts 51. The shafts 51 in turn are spring-urged by the helical springs 52 acting against the machine frame 53 and end flanges 54, urging the shafts 51 toward the left as viewed in FIG. 3.

Means are provided for raising and lowering the frame 47 and its attached pins 46. This means includes cams 55 which are rotatably driven by chains 56 and sprockets 57 forming a drive train running from the main drive motor (not shown). It will be observed from the shapes of the cams 55 appearing in FIG. 3 that these cams serve to raise and lower the frame 47 in a definite timed sequence.

Means are provided for moving the frame 47 back and forth longitudinally along the conveyor path. Such means includes the cams 60 which operate against rollers 61 fixed to the shafts 51. This reciprocating motion is transmitted to the frame 47 and to the pins 46 through the pins 50.

Accordingly, it will be observed that in the operation of the apparatus under the influence of the drive motor, the pins 46 are raised until they enter corresponding holes on several trays T, which are then moved longitudinally in unison through a distance equal to the space between centers of the eggs on the trays T. Pins 46 are then lowered out of and away from the holes on the trays, are reciprocated rearwardly until they are directly beneath the next set of holes on the trays T, and are then raised again to penetrate into such next holes on the trays. In this manner, the trays are gradually indexed in a downstream direction, one row at a time, and come to a stop at the end of each indexing movement.

Means are provided for maintaining the rows of trays in a predetermined position when the pins 46 are lowered out of engagement therewith. Such means includes a plurality of positioning pins 62 which are mounted on a positioning frame 63 which is reciprocated up and down in timed relation to the movement of the frame 47 up and down. Specifically, the cams 64 bearing upon rollers 65 operating through arms 66 on which the positioning pins 62 are mounted, cause the pins 62 to rise when the pins 50 descend, and to descent when the pins 50 rise. This apparatus protects against accidental displacement of the trays while they are at rest.

The number 31 generically designates the candling portion of the apparatus. Means are provided for automatically operating the candling apparatus 31 in timed relation with the egg-advancing and indexing apparatus just described. This means includes a chain 70 operated from the main drive train of the apparatus, which is connected to rotate cams 71 which bear upon rollers 72 mounted on a slide 73 which is slidably carried by a fixed support 73 (a) and carrying at its lower end a plurality of lighting and marking devices 34 and 74. Springs 74b continuously urge the slide 73 upwardly with respect to fixed support 73 (a). The cams 71 are timed with the cams which govern the indexing of the eggs along the conveyor path, such that the lighting device 74 is in its elevated position when an egg E stops beneath it, and it then descends automatically to perform the egg candling operation, details of which will appear in further detail hereinafter.

The details of the egg candling apparatus appear more particularly in FIGS. 5 and 6 of the drawings. Attached to the slide 73 is a plurality of housings 75 each containing a light bulb 76 connected to an electrical source by a wire 77. Depending from each housing 75 is an elastic, light shielding bellows 80 of generally circular cross section. As shown in FIG. 5, the bellows consists of a multiplicity of inwardly and outwardly flared portions, and terminates at its lower end with an outwardly flared portion 81. This is an important and advantageous feature of this invention, since the bellows not only provides an exceedingly effective light shield for the light generated by bulb 76, but it also accommodates itself admirably to eggs of different heights, sizes and shapes, or even to an egg which is inclined away from the vertical, as shown in FIG. 6. Desirably, electric switching means are provided for deenergizing the lights 76 when the bellows 80 are raised above the eggs.

The apparatus shown in FIGS. 5 and 6 also includes a marking device 34, including a support 82 reciprocatably carrying a marker 83 which may be actuated electrically by the operator of the device through a solenoid 84 connected to the control panel of the apparatus. The solenoid 84 operates a lever 85 hingedly connected to the marker 83 to reciprocate the same in its support 82, toward and away from the egg E. In this manner, the operator is enabled to make a mark on the shell of any egg that is considered to be defective, all without interfering with the overall progress of the egg candling operation.

Turning now to FIG. 7 of the drawings, the apparatus shown therein is housed within a sterile hood 90 having inspection windows 91 and sterilizing lamps 92. The sterilizing station 36 is driven by a chain 93 which is also shown in FIG. 3, through the drive train coming from the main drive motor of the apparatus, all as heretofore described. Thus, the sterilizing operation is driven automatically in timed relation to the driving of the egg advancing and indexing mean heretofore described.

The sterilizing station includes a pair of cams 94 which bear upon rollers 95 carried upon slide 96, thus reciprocating the slide 96 up and down and toward and away from the egg trays T. The return movement of the slide upwardly is, of course, accomplished by the spring 97.

The apparatus shown in FIG. 7 also includes a similarly arranged set of cams, slides and rollers for the punching and inoculating station 37 and for sealing station 40, both of which are mounted within the sterile hood 90. As heretofore described in connection with the sterilizing station 36, both the stations 37 and 40 are automatically driven by the chains 100, 101, in timed relation to the operation of the egg advancing apparatus.

The specific details of construction of the sterilizing apparatus appear in FIGS. 8 and 9 of the drawings. The vertically reciprocable slide 96 which extends across the entire apparatus, is fixed to a plurality of laterally spaced apart cylindrical tubes 102, each located directly above an egg-containing tray pocket. A source of tincture or iodine or other sterilizing liquid (not shown) is connected through a supply tube 103 to the cylinder 102 which has a central bore 104. At the lower end of cylinder 102 is a sensing device comprehensively designated by the number 105. This sensing device 105 includes a sleeve 106 affixed to and depending from the lower end of the cylinder 102, to which is attached a pair of arms 107, 107', one of which is provided with a pivot 110 from which an ear 111 is swingingly dependent. Attached to the ear 111 is a mask structure 109 which includes a cylindrical hollow rubber tube 112 which is arranged for contact with the upper portion of the shell of the egg. The arm 107' is provided with a stop member 113 spaced slightly beneath the extension 114 of the mask 109.

Also carried on the outer surface of the sleeve 106 is an electric switch 116 having a plunger 115 arranged to come into contact with the extension 114 when the mask 109 is raised, and to come out of contact when the mask extension is lowered (by gravity) against the stop 113. Thus, it will be understood that when the slide 96 is lowered, the masks 112 of all the sterilizing devices across the row come into contact with the eggs beneath them, thus swinging each mask individually pivotally upwardly about the pivot 110, actuating each switch 116. To compensate for different egg heights and to protect the eggs against damage, lightweight yieldable compensating springs 118 are provided between each slide 96 and its associated sleeve 106.

In each such device, switch 116 is connected electrically to a circuit connected to a solenoid valve (not shown) functioning to admit the tincture of iodine into the tube 103 under pressure. At the lower end of cylinder 104 is a spray nozzle 117 provided with a ball check valve 120, which is arranged to direct a spray of iodine S against the localized area of the upper portion of the shell.

It will be appreciated that, at the time the sterilizing device is automatically lowered by its cam, if no egg is present beneath the mask 112, the mark 112 is not urged upwardly at all and thus does not energize the spraying device. In this manner, the spraying device functions as a sensing device, and provides a spray only when an egg is located beneath the mask 112 and actuates the sensing device.

FIGS. 10 and 11 show the details of the punching and inoculating apparatus 37. Rods 121 are operated by cams 94' and reciprocate up and down in timed relation with the indexing movement of the eggs along the conveyor. Rod 121 is in its upper position as shown in FIG. 11 as each egg is indexed to a stop beneath it. At its lower end, the rod 121 carries a structure including a pivotally mounted masking and egg-sensing tube 122 having a structure and operation similar to that heretofore described in connection with FIGS. 8 and 9; a switch 123 mounted on a plate 121d which floats on rod 121 and coacts with the extension 124 to energize the apparatus electrically. Springs 121a, 121b and 121c are provided to compensate the movement of rods 121 to accommodate eggs of various heights, in the same manner as previously disclosed.

A cylindrical 125 is mounted on the plate 121d; its piston 125a is connected to reciprocate a bracket 126 up and down along the rod. The bracket 126 carries a cylinder 127 having, at its lower end, a punch tube 130 provided with a sharpened and inclined lower end 131 and having a central bore 132.

Also mounted on the plate 121d at the upper end thereof, is another cylinder 133 having a piston 134 which is attached to a bracket 135 which in turn carries another cylinder 136. Depending from the lower end of the cylinder 136 is an elongated hypodermic needle 137 which passes through apertures in the lower cylinder 127 and through the bore 132 in the punch tube 130. Attached to the cylinder 136 is a tube 140 arranged for the introduction of the virus-bearing liquid.

Bracket 135 has an arm arranged to actuate a switch 135a carried by plate 121d, and connected electrically to a four-way solenoid valve (not shown) which actuates a cylinder 135b operating a reciprocating pump 135c to provide a measured shot of liquid virus through tube 140.

Located above the switch 123 is another switch 141 which is arranged for actuation by contact with an adjustable threaded member 142 carried by the bracket 126.

The operation of the apparatus appearing in FIGS. 10 and 11 will now become apparent. After an egg E has assumed its proper position beneath the punch tube 130, the rod 121 is automatically actuated by its cam 94' in a downward direction until the tube 122 contacts the top of the egg shell, thus energizing switch 123 which is connected electrically to a solenoid valve connected to the pressure line of cylinder 125, extending its piston downwardly and forcing the punch tube end 131 down through the uppermost portion of the egg shell. This creates a hole in a portion of the egg shell which has previously been sterilized.

The extent of penetration of punch tube 130 is limited by the limited stroke length of the piston 125a. In this manner the punch tube end 131 always penetrates the shell but does not extend down into the egg far enough to harm the embryo.

With the downward movement of the piston of cylinder 125, adjustable screw 142 contacts switch 141 which is connected electrically to a solenoid valve (not shown) in the pressure line of cylinder 133, thus admitting pressure to the cylinder, forcing piston 134 and brackets 135 downwardly. This moves the cylinder 136 and its hypodermic needle 137 bodily downwardly, and the hypodermic needle 137 passes down through the bore in the punch tube 130 and into the extra-embryonic fluids of the egg E. The switch 135a is connected to the solenoid valve heretofore mentioned, but not shown in the drawings, which is connected to cylinder 135b which injects a measured quantity of virus into the egg.

Again, the limitation on stroke length of piston 134 assures that the hypodermic needle 137 penetrates into the extra-embryonic fluids but not onto the embryo.

With continued rotation of the cams 94' located above the rods 121, the rods 121 move upwardly, thus opening the switch 123, reversing the energization of cylinder 125 by reversal of the solenoid valve (not shown), moving its piston together with bracket 126 upwardly, thus deenergizing switch 141, reversing the energization of piston 133, and moving the bracket 135 and cylinder 136 upwardly, and reversing switch 135a, all the parts then having the relative positions illustrated in FIG. 11 of the drawings. In this manner, the punch tube 130 is first moved quickly downwardly in a manner to penetrate the egg shell, the hypodermic needle 137 is then moved downwardly through the bore in the punch tube, a shot of virus-bearing fluid is injected into the extra-embryonic fluids, and the punch tube and hypodermic needle are then quickly withdrawn upwardly from the egg. In this manner, the hypodermic needle 137 does not come into contact with any part of the egg shell and this is an important and advantageous feature of this invention since the danger of contamination is thereby greatly reduced or even entirely eliminated.

FIGS. 19 and 20 show a modified form of punching and inoculating apparatus. In these FIGS., parts which are similar to those heretofore described have been assigned the same numbers. However, in this modification, mechanical springs are utilized in order to effect the movements of the punch tube 130 and of the hypodermic needle 137, all automatically and in response to the function of the cams and all in timed relation to the indexing movement of the eggs in their trays. In this apparatus, a lower cylinder 150 is slidably mounted in a fixed tube 149 and in its bore is a reciprocably mounted upper cylinder 151. The lower cylinder 150 carries the punch tube 130 while the upper cylinder 151 carries the hypodermic needle 137. A helical spring 152 urges the lower cylinder 150 upwardly with respect to the tube 149. Cylinder 151 is movable up and down within the cylinder 150, and a helical spring 154 urges it upwardly with respect thereto. The number 155 designates a helical compensating spring extending between the cylinder 150 and an extension 148 on the slide member 121', while a smaller helical spring 156 extends between the slide 121' and the cylinder 151. Compensating spring 155 compensates for variations of height of eggs, all as heretofore described.

In operation, the strengths and sizes of the springs are so related that when the slide member 121' descends, the punch tube 130 is first driven through the shell and when it reaches its limit position, further force operating through the springs forces the cylinder 151 downwardly within the cylinder 150, forcing the hypodermic needle downwardly through the punch tube 130. Further rotation of the cam which actuates the slide member 121' brings the parts to the position shown in FIG. 20.

The sensing switch structure which is mounted on the bottom of the punch tube 130, functions in the same manner as that previously described.

FIG. 12 of the drawings shows the apparatus for sensing the presence of the egg and for sealing the opening made by the punch tube 130. Here again, this apparatus is operated by a vertically reciprocable slide 159, actuated by cams from above as shown in FIG. 7, and includes a cylinder 160 which is affixed to the slide 159, and a compensating spring 160a. It includes a sensing structure 161 similar to those heretofore described, including a switch 162 which is connected to control a solenoid valve (not shown) connected to a supply of liquid sealant which is to be applied to cover the hole in the egg shell. In this embodiment of the invention, a rubber tube 163 is provided at the bottom of the sensing apparatus 161, such tube having a depressed perimeter forming a valley adapted to accommodate a garter spring 164. A gauze shield screen 165 is extended across the lower opening of the rubber mask 163, and this is held in place by the garter spring 164 as shown. In operation, it will be apparent that with the lowering of the slide 159, the switch 162 is actuated, causing a spray of wax emulsion or the like to be ejected through the nozzle at the bottom of the tube 166, which spray penetrates through the gauze shield screen for uniform application to the surface of the egg shell, covering the hole H. With the continued rotation of the cams which actuate the slide 159, the entire apparatus is withdrawn upwardly, all heretofore described.

FIG. 13 shows the details of a preferred form of apparatus for collecting the extra-embryonic fluids after embryonic growth has been completed, as heretofore described in connection with FIGS. 1 and 2. It is to be understood that, after incubation and embryonic growth, the eggs while still in their trays are again candled, and the defective eggs marked and replaced. Following this, they move along the conveyor to enter the apparatus as shown in FIG. 13, from the right.

As shown in FIG. 13, the apparatus is provided with a sterile hood 170 having an entrance 171 for the eggs in their trays, which are indexed along in a stepwise manner by the index pins 46 as heretofore described. The chop-off station 41 includes cams 172 driven by the chain 173 which is driven by the main power source in timed relation to the indexing movement of the egg trays on their conveyor, and in the manner heretofore described, cams 172 reciprocate a slide 174 up and down in order to actuate a chopping mechanism, the details of which will be discussed in further detail hereinafter. As shown in FIG. 13, however, it will be apparent that the chopping mechanism removes the top portion of the egg shell, leaving the eggs open at the top.

The harvesting apparatus 42 is similarly driven by cams 175 which reciprocate a slide 176 up and down in the manner heretofore described, in order to drive the harvesting mechanism for removing the extra-embryonic fluids from the opened eggs.

Located at the downstream end of the hood 170 is a dumping station 43 including ledges 181 of angles 45 over which the trays are driven by their conveyor, a depressed rearwardly curved trough having curved guides 182 extending along the edges of the hood 170 for engagement with the edge flanges of the trays, and a chute 183 forming a conduit for the egg shells and their remaining contents. The number 184 designates a return conveyor for the empty trays, which conducts the trays to a tray washer (not shown). Conveyor 184 is driven by a chain 185 which in turn is driven from the main drive train of the apparatus. In operation, it will be appreciated that the continued indexing movement of the trays under the influence of the pins 46 forces each tray over the ledges 181, causing it to tilt as indicated in dot-dash lines in FIG. 13, whereupon continued indexing movement of the following tray overturns the tray, causing it to assume the inclined position shown in solid lines in FIG. 13, whereupon the egg shells and contents are dumped out of the tray. The tray then slides downwardly along the curved guides 182, onto the return conveyor 184, as shown.

FIGS. 14–16 show the details of a preferred form of a chopping device in accordance with this invention. The slide 174 carries a fixed cylindrical tube 186 having an air supply tube 187. Affixed at the lower end of tube 186 is a sleeve 190 carrying a solenoid 191 connected through a bellcrank lever 192 to a chopping blade 193. Depending from the sleeve 190 is a resilient cup 194 shaped to engage the upper portion of each egg and to hold it firmly in position during the chopping operation. Extending downwardly within the sleeve 190 is an air tube 195 having a curved tip 196 directed to focus a stream of air upon the egg shell portion which is chopped off by the chopping blade 193. The number 197 designates a conduit for the chopped shell, which is connected to a source of vacuum (not shown), through a tube 200.

The entire device is yieldably urged against the egg E under the influence of a helical compensating spring 201 which is disposed between the sleeve 190 and a block 202 carried by the slide 174.

Means are provided for the automatic actuation of the device shown in FIG. 14. This means includes a switch 203 which is connected electrically to the solenoid 191 to actuate the chopping device. Switch 203 is also connected to a solenoid valve (not shown) in the vacuum line, causing the vacuum to be applied to the conduit 197. Another switch 204 located above the switch 203 is connected to the source of air supply and regulates this by operating a solenoid valve (not shown) connected into the air supply tube 187. Protuberances 205, 206 are mounted on the sleeve 190 in position to actuate the switches 203, 204 respectively.

In the operation of the apparatus shown in FIGS. 14–16, when the egg is indexed beneath the resilient cups 194, the cups are in their elevated position as shown in FIG. 15. With the continued rotation of the cams 172 (FIG. 13), the slide 174 appearing in FIG. 14 is moved downwardly until the resilient cup 194 embraces the egg and the switches 203 and 204 are actuated, energizing the chopping device causing the plunger of the solenoid 191 to move downwardly, swinging the chopping blade 193 downwardly toward the egg and chopping off the top of the egg at a level above the bottom of the air sac. Simultaneously, vacuum and air are applied in a manner to remove the chopped shell and to prevent it from falling down into the extra-embryonic fluids of the egg. Upon completion of the chopping operation, continued rotation of the cams 172 causes the slide 174 to rise, the switches 203, 204 are deenergized and the chopping blade is withdrawn to the position shown in FIG. 15.

FIGS. 17 and 18 show the details of a preferred form of harvesting apparatus in accordance with this invention. Here again it will be appreciated that the slide 176 is operated by the cams 175 as shown in FIG. 13, and is reciprocated up and down thereby. When the egg which is open at the top comes to a stop beneath the harvesting component of the apparatus, the continued rotation of the cams 175 causes the slide 176 to descent.

Affixed to the slide 176 is a cylinder 214 carried in a block 215 affixed to the slide 176. A vacuum tube 216 is affixed to the top of the cylinder 214. Depending from the cylinder 214 is a sleeve 217 carrying at its lower extremity a sensing device 218 which is similar to sensing devices heretofore described, and which operates in conjunction with a switch 219 to energize the apparatus in response to the sensing of the presence of an egg beneath and in contact with the flexible rubber tube 220.

The sleeve 217 is mounted for vertical reciprocation with respect to the cylinder 214 which carries a piston 222 which fits within the bore of the sleeve 217.

Located at the lower end of the cylinder 214 is an enlarged head 223 which is generally circular in cross section and which has a concave curvature 224 which its lower end. The head 223 is provided, as shown, with a multiplicity of sidewardly extending passages 225 all connecting to a central passage 226 which is connected to the vacuum tube 216.

In operation, the apparatus of FIGS. 17 and 18 is moved downwardly under the influence of slide 176 which moves the tube 220 down into contact with the upper portion of the egg E. Continued movement of slide 176 downwardly forces the cylinder 214 together with the attached head 223 downwardly through the opening in the eggshell formed by the chopping device, and the concave portion of the head 223 gently displaces the embryo E' and the yolk Y downwardly toward the bottom of the egg, thus freeing a maximum quantity of the extra-embryonic fluids which are located above the embryo and the yolk. As the head 223 approaches its lowermost position, the sensing device 218 actuates the switch 219, which is connected to a solenoid valve (not shown) in the vacuum line 216, connecting the head 223 to the vacuum source, thus sucking out the extra-embryonic fluids. Continued rotation of the cams 175 causes the slide 176 to rise, bringing the entire apparatus up above the egg, to the position as shown in FIG. 18. As heretofore described, a helical compensating spring 230 is provided for controlling the amount of downwardly directed pressure to be applied to the shell of the egg during the harvesting operation and this spring 230 is extended to the position shown in FIG. 18 when the harvesting apparatus is lifted up away from the egg.

It will be appreciated that the sensing device shown in connection with some of the components may be used also in connection with any or all. It will be appreciated further that this and many other important features of this invention are common to the steps of spraying, punching, inoculating, sealing, chopping and harvesting, all of which steps are referred to generically herein as "treating" the egg.

While this invention has been described with reference to specific embodiments thereof, it will be apparent to those skilled in the art that various changes other than those referred to above may be made in the form of the device and method, that equivalent elements may be substituted for those illustrated in the drawings, that parts may be reversed, and that certain features of the invention may be used to advantage independently of the use of other features, all within the spirit and scope of the invention as defined in the appended claims.

We claim:

1. In an apparatus for propagating virus in embryonated eggs for the production of vaccines, the combination which comprises:
   a. means for moving said eggs along a predetermined path;
   b. one station along said path having egg-treating means for treating the eggs by spraying, punching, inoculating or, sealing, or harvesting the extra-embryonic fluids after propagation;
   c. means for moving the egg-treating means up and down and thus away from and toward the eggs in said path;
   d. means for automatically timing the movement of the treating means in relation with the movement of the eggs along the path to lower the egg-treating means into contact with the egg beneath the egg-treating means;
   e. egg-sensing means carried by said treating means and responsive to contact with the egg to be treated for automatically sensing the presence of the egg to be treated, and
   f. means responsive to actuation of said egg sensing means for energizing said egg treating means to perform the treating operation on the egg contacted.

2. An apparatus according to claim 1 in which:
   a. the egg-treating means includes a member positioned in the lower portion thereof and movable up and down therewith, said member having a stop lip;
   b. the means responsive to actuation of said egg sensing means for energizing the corresponding egg-treating means to perform the treating operation on the egg contacted, includes an electrical switch positioned on the egg-treating means and movable up and down therewith; and
   c. the egg-sensing means includes:
      i. an arm pivotally supported at one end to said member and having its other end normally resting against said stop lip;
      ii. a relatively short hollow tube mounted upon the underside of said arm and extending downwardly therefrom with the longitudinal axis of the tube substantially vertical, the inside diameter of said tube being smaller than the outside diameter of an egg on a substantially horizontal plane through the upper portion of an egg when the egg is positioned with its pointed end down, so that the lower edge of said tube engages the egg beneath it when the egg treating means is moved downwardly toward the egg beneath it; and
      iii. an actuating pin for said electrical switch, said pin moving to actuate said switch when said arm pivots upwardly and moves away from said stop lip and engages said actuating pin,
   whereby, when said egg-treating means moves downwardly toward the egg beneath it, the lower edge of said hollow tube engages the upper portion of the egg beneath it, and then, as the egg-treating means attempts to move further downward, the top portion of the egg acts as a fulcrum for said arm and causes said arm to move away from said stop lip and to move said actuating pin to cause said electrical switch to energize the egg-treating means to perform the treating operation on the egg contacted.

3. In an apparatus for indexing a plurality of trays provided with flanges having apertures arranged along the edges thereof, the combination which comprises conveying means including supporting means for supporting said trays from beneath, means forming a plurality of pins extending upwardly from beneath the trays and shaped to fit into the apertures in said trays, a common supporting means for carrying said pins, drive means constructed and arranged to move said pins up and down toward and away from said trays for engagement with and disengagement from said apertures in said trays, and further drive means operated in timed relation with the drive means first mentioned, for moving said pins longitudinally in a predetermined direction when said pins are engaged within said apertures, and for returning said pins in the opposite direction when said pins are disengaged from said apertures.

4. In an apparatus for processing a plurality of eggs contained in trays provided with flanges having apertures arranged along the edges thereof, the combination which comprises conveying means including supporting means for supporting said trays from beneath, means forming a plurality of pins extending upwardly from beneath said trays and shaped to fit into the apertures in said trays, a common supporting means for carrying said pins, drive means constructed and arranged to move said supporting means and pins up and down toward and away from said trays for engagement with and disengagement from said apertures in said trays, and further drive means operated in timed relation with the drive means first mentioned, for moving said pins longitudinally in a predetermined direction when said pins are engaged within said apertures, and for returning said pins in the opposite direction when said pins are disengaged from said apertures, a multiplicity of light sources arranged for movement up and down toward and away from the eggs carried in said trays, and means for moving said light sources in timed relation to the movement of said eggs on said trays, and for contacting said eggs with said light sources when said pins are disengaged from said apertures in said trays.

5. In an apparatus for determining the presence of a living embryo in an egg, the combination which comprises means for moving said egg along a predetermined path, lighting means movable at an angle to said predetermined path and in timed relation with the movement of said egg, means forming a flexible bellows extending down from said lighting means and arranged to contact the upper portion of the shell of said egg, means for stopping said lighting means and said bellows while said bellows contacts said egg, thus providing for visual inspection of said egg while thus lighted, and automatic means for moving said bellows away from said egg.

6. The apparatus defined in claim 5 wherein said bellows includes a plurality of foldable accordion-shaped sections the lowermost of which flares outwardly.

7. The apparatus defined in claim 5 wherein the movements of the egg and of the bellows are both intermittent and include a period of rest when said bellows is in contact with said egg.

8. In an apparatus for penetrating into and inoculating an egg, the combination which comprises means for moving said egg along a predetermined path, an inoculating means movable up and down and toward and away from said path, means for timing the movement of said inoculating means in timed relation with the movement of the egg along the path, automatic means for lowering said inoculating means into contact with said egg, means automatically sensing the presence of said egg in response to contact therewith, and means for automatically energizing the inoculating apparatus to penetrate and inoculate said egg in response to such contact.

9. Apparatus for inoculating an egg with a liquid virus, comprising conveyor means constructed and arranged for moving said egg along a predetermined path, a punching device arranged at an angle to said predetermined path, means for moving said punching device toward and away from said egg in timed relation with the movement of said egg, said punching-device including means for penetrating the upper portion of the shell of said egg, an inoculating device extending through said punching device, means for moving said inoculating device down into the extra-embryonic fluids of the egg, and means for actuating the inoculating device while thus positioned.

10. The apparatus defined in claim 9, wherein the means for moving said punching device and said inoculating device comprise separate cylinders.

11. The apparatus defined in claim 9, wherein an automatic means is provided for actuating the cylinder for the inoculating device in response to penetrating movement of said punching device.

12. In an apparatus for spraying a shell in conjunction with inoculating an egg with a liquid virus, the combination which comprises means for moving said egg along a predetermined path, a spray device movable at an angle to said predetermined path and in timed relation with the movement of said egg, sensing means carried by the spray device and arranged to contact the upper portion of the shell of said egg and automatic means for energizing the spray device while thus positioned.

13. The apparatus defined in claim 12 wherein said spray device is directed against the top of the shell and is connected to a source of sterilizing fluid.

14. The apparatus defined in claim 13, wherein said spray device is connected to a source of hardenable fluid sprayed is directed against a hole formed at an upper portion of said shell, and wherein means are provided for disposing a fine screen between said spray device and said shell.

15. In an apparatus for harvesting the extra-embryonic fluids of embryonated eggs which have previously been inoculated with a live virus and incubated to produce virus-containing extra-embryonic fluids in the eggs, said apparatus including means for supporting a plurality of eggs with their blunt ends up and for moving said eggs, one at a time, to a harvesting station after the tops of the blunt ends of the eggs have been cut and removed, the improvement which comprises:
  a. a harvesting device having a tube with a bore and a head at the bottom thereof larger than the exterior diameter of the tube but smaller than the openings in the eggs;
  b. means supporting said harvesting device above the egg in said harvesting station for reciprocating movement in a vertical direction, so that the lower end of said harvesting device may be inserted downwardly through the hole in the egg in the harvesting station, and
  c. means actuated in timed relation to the movement of the eggs to the harvesting station for moving the harvesting device downwardly into each egg at the harvesting station to depress the embryo in that egg and for sucking out of the egg, through the bore of the tube of the harvesting device, the extra-embryonic fluids of the egg, said means thereafter withdrawing the harvesting device from that egg before that egg is moved out of the harvesting station and the next egg moved to the harvesting station.

16. An apparatus as described in claim 15 in which the head at the bottom of the harvesting device has a bottom surface which is concave upwardly, with the head having a plurality of radially directed passaged therein extending outwardly to the side of the head and connected centrally to the bore of the tube.

17. In an egg candling apparatus having means supporting the egg to be candled with its blunt end projecting from the egg supporting means, an emitter of light rays, and means supporting the light emitter in the proximity of the egg when the egg is supported by the egg supporting means, the improvement comprising:
  a. means including a light-opaque tube having an inner end adjacent said light emitter and supported by said light emitter supporting means, and an outer end projecting in the direction of the egg to be candled, preventing the transmission of light from said light emitter in all directions except outwardly from the outer end of said light-opaque tube; and
  b. means for moving one of said supporting means relative to the other so that the outer end of said light-opaque tube engages the blunt end of the egg in said egg supporting means when that egg is to be candled;
  c. said light-opaque tube having at least that part of it which is at and near the outer end of the tube, in the form of a flexible bellows with annular wall sections, and having at the outermost end of the bellows an annular wall section which flares radially outwardly, whereby, during egg candling, a light seal is readily provided between the egg and the outermost end of the tube which is effective for all of the normal variations encountered in egg sizes and for all of the normal variations in the orientation of the egg in the egg supporting means, so that the interior of the egg is illuminated by the light rays from said light emitter with no significant amount of light from the light emitter reaching the eye of the candler that does not first pass through the egg being candled.

18. In an apparatus for propagating virus in eggs for the production of vaccines, the combination which comprises:
  a. means for moving said eggs along a predetermined path;
  b. at least two stations along said path having egg treating means for treating the eggs by spraying, punching, inoculating, or sealing;

c. means for moving each egg treating means up and down and thus away from and toward the eggs in said path;

d. means for automatically timing the movement of each egg treating means in relation with the movement of the eggs along the path to lower each egg treating means into contact with the egg beneath the corresponding egg treating means;

e. egg-sensing means carried by each such egg treating means and responsive to contact with the egg to be treated for automatically sensing the presence of the egg to be treated, and f. means responsive to the individual actuation of each such egg sensing means for energizing the corresponding egg-treating means to perform the treating operation on the egg contacted.

19. In an apparatus for propagating virus in embryonated eggs for the production of vaccines, the combination which comprises:

a. conveyor means for moving said eggs intermittently along a predetermined path with a dwell period at a station along said path having egg-treating means that discharges either an antiseptic or sealing liquid against the surface of the egg or a virus-containing inoculating liquid inside a hole at the top of the egg;

b. means for moving said egg-treating means up and down and thus away from and toward the eggs in said path;

c. means for automatically timing the movement of said egg treating means in relation with the movement of the eggs along the path to lower said egg treating means close to the egg beneath it in a dwell period of said conveyor means;

d. egg-sensing means carried by said treating means and responsive to contact with the egg to be treated for automatically sensing the presence of the egg to be treated; and e. means responsive to actuation of said egg sensing means for energizing the egg-treating means to perform the treating operation on the egg contacted;

whereby no such liquid is discharged by the egg-treating means onto the conveyor means when the conveyor means fails to have, during a dwell period, an egg under the egg-treating means.

20. An apparatus for inoculation of embryonated eggs, comprising in combination:

a. egg-holding means capable of holding eggs in aligned rows;

b. a row of hypodermic needles aligned with one row of eggs;

c. a first means for producing relative movement between a row of eggs and the hypodermic needles aligned with such row of eggs;

d. a second means adjacent each needle that (i) engages the top of the corresponding egg as the first means brings the needles into proximity with the eggs, (ii) causes the corresponding egg to be punctured, and (iii) causes the tips of the respective needles to be introduced each into its corresponding egg a fixed depth regardless of whether that egg is small, medium or large, and regardless of the size of the other eggs in the row;

e. a third means connected to each needle for pumping a predetermined volume of inoculum through each needle when it has entered the eggshell and penetrated to said fixed depth; and f. a fourth means for returning the second means to their original position upon completion of the inoculation of the row of eggs.

* * * * *